United States Patent [19]

Jackson et al.

[11] 3,861,757

[45] Jan. 21, 1975

[54] ADAPTIVE BRAKING MODULATOR

[75] Inventors: David A. Jackson; Martin A. Shields, both of South Bend, Ind.

[73] Assignee: The Bendix Corporation, South Bend, Ind.

[22] Filed: Sept. 17, 1973

[21] Appl. No.: 398,271

[52] U.S. Cl. ........ 303/21 AF, 188/181 A, 303/21 F
[51] Int. Cl. .............................................. B60f 8/06
[58] Field of Search .......... 303/21 AF, 21 F, 61–63, 303/68–69, 10, 6 C; 188/181 A

[56] References Cited
UNITED STATES PATENTS

| | | | |
|---|---|---|---|
| 3,602,554 | 8/1971 | Ichimura et al. | 303/21 F |
| 3,610,701 | 10/1971 | Riordan | 303/21 AF |
| 3,671,085 | 6/1972 | Pasek et al. | 303/21 F |
| 3,672,731 | 6/1972 | Koivunen | 303/21 F |
| 3,788,710 | 1/1974 | Grunberg et al. | 303/21 AF |

Primary Examiner—Trygve M. Blix
Assistant Examiner—D. C. Butler
Attorney, Agent, or Firm—Ken C. Decker; William N. Antonis

[57] ABSTRACT

A brake pressure modulator for an adaptive braking system is disclosed which uses the pressure generated by the vehicle's power steering pump as a modulator power source. The usual failsafe spring, which is normally used to maintain braking pressure upon a failure in the modulator power source has been eliminated, and is replaced by a bypass passage and valve which is operated by a failsafe piston responsive to a decrease in the fluid pressure output of the power steering pump to open the bypass passage and to therefore communicate fluid directly between the inlet and outlet of the modulator. Further failsafe protection is provided by a check valve which traps pressure controlling the modulating piston in the event of failure in the fluid pressure output of the power steering pump.

7 Claims, 1 Drawing Figure

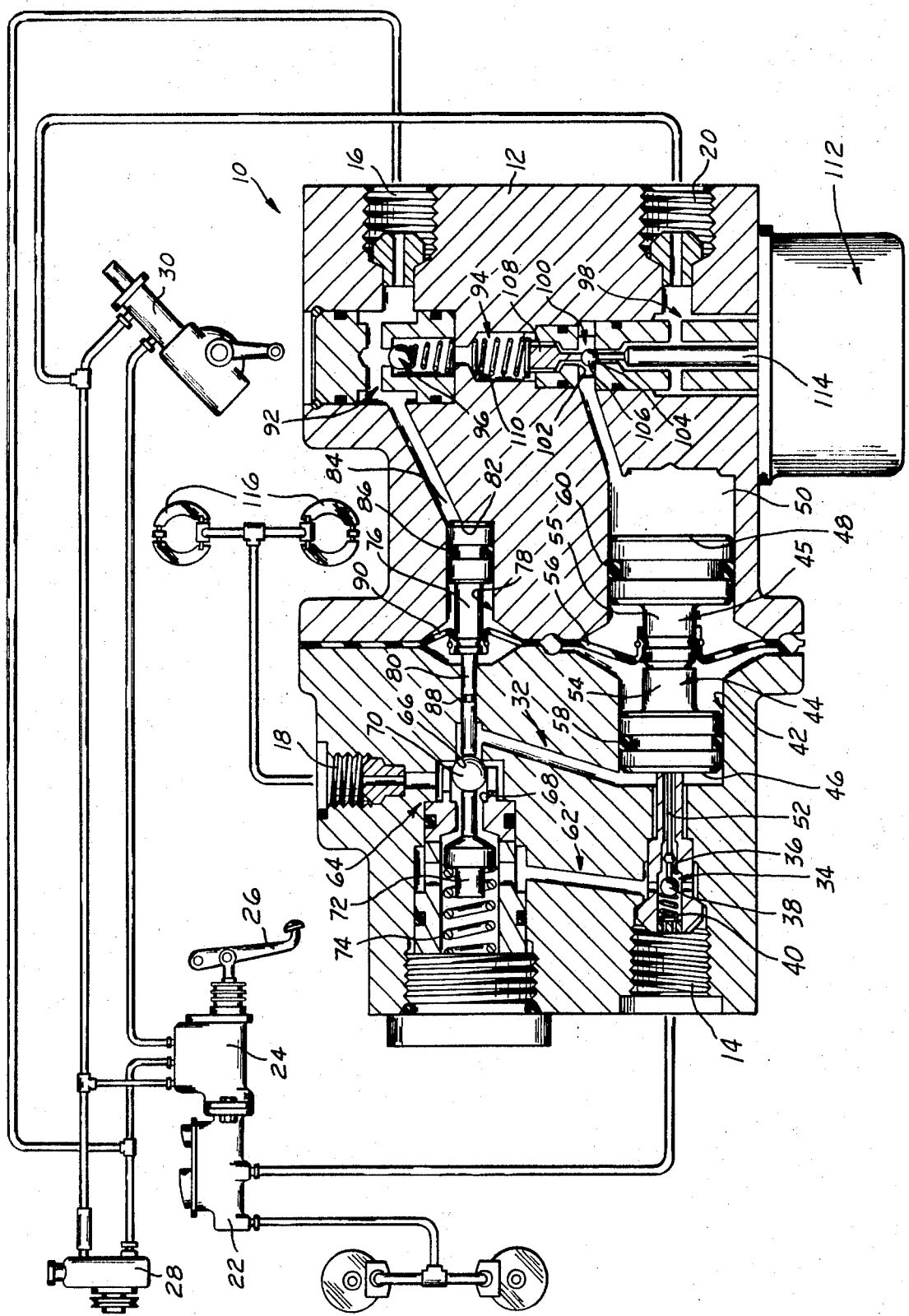

ADAPTIVE BRAKING MODULATOR

BACKGROUND OF THE INVENTION

This invention relates to a modulator for an adaptive braking system.

Prior art adaptive braking modulators have usually included an adaptive braking valve, a modulating piston which opens and closes the adaptive braking valve, an electrically operated valve which controls fluid communication to the modulating piston for actuating the latter, and a relatively large spring which is used to maintain the modulating piston in a position holding the adaptive braking valve open in case of failure of the fluid pressure source. The large spring, in addition to making the unit more costly, requires that the modulator be much larger than would otherwise be required, and also requires that the modulator power piston used to actuate the modulator he much larger than would otherwise be required since the fluid pressure acting against the power piston not only must overcome braking pressure, but also must overcome the force of the spring. However, the failsafe spring used in prior art modulators were heretofore thought to be absolutely essential to the safe operation of the modulator, since it is imperative that the brakes of the vehicle remain operative in case of failure of the modulator power source. The present invention permits the failsafe spring to be eliminated, while providing a redundant failsafe system to insure operation of the vehicle's brakes even if the modulator power supply fails. Furthermore, in most prior art low-cost modulators, the modulator operated in such a way that pulsations generated by the decay and build of the braking pressure were transmitted to the vehicle's master cylinder, and therefore could be noticed by the vehicle operator. Although these pulsations are not altogether objectionable inasmuch as they notify the vehicle operator that the vehicle's brakes are being controlled by the adaptive braking system, it is generally believed to be desirable that these pulsations be eliminated and that the driver be notified of the operation of the adaptive braking system by a warning light or similar instrument in the operator's compartment of the vehicle.

SUMMARY OF THE INVENTION

Therefore, an important object of our invention is to provide an adaptive braking modulator that uses the fluid pressure output of the vehicle's power steering pump to modulate braking pressure.

Another important object of our invention is to provide a brake pressure modulator which retains braking pressure in the event of a total loss of fluid pressure from the power steering pump.

Another important object of our invention is to eliminate the failsafe spring used in prior art modulators to thereby reduce the size of the modulator and to reduce consumption of fluid from the fluid power source.

A further object of our invention is to eliminate brake pedal motion by isolation of the master cylinder pressure from the wheel cylinder pressure during normal adaptive braking operation.

DESCRIPTION OF THE DRAWINGS

The sole FIGURE of the drawing is a schematic illustration of a vehicle brake system with a modulator made pursuant to the teachings of our present invention illustrated in cross section.

DETAILED DESCRIPTION

Referring now to the drawing, the brake pressure modulator generally indicated by the numeral 10 includes a housing 12 having a first inlet port 14, a second inlet port 16, a first outlet port 18, and a second outlet port 20. The inlet port 14 is connected to one side of a conventional split system master cylinder 22 of a type well known to those skilled in the art. The master cylinder 22 is actuated by a hydraulic brake booster 24, for example, of the type shown in U.S. Pat. No. 3,603,209, owned by the assignee of the present invention and incorporated herein by reference. The booster 24 is actuated by the conventional brake pedal 26 mounted in the vehicle operator's compartment. Upon the actuation of the pedal 26, booster 24 uses the fluid pressure developed by the vehicle's power steering pump 28 to effect actuation of the master cylinder 22, thereby generating braking pressure which is communicated to the inlet 14. The high pressure fluid developed by the power steering pump 28, after passing through the booster 24, is communicated to the inlet of the vehicle's power steering gear 30, in a manner well known to those skilled in the art. The outlet of the power steering gear 30, the return port of the booster 24, and the outlet port 20 of the modulator 10 are all connected to the inlet or low pressure side of the power steering pump 28. Similarly, the high pressure side of the pump 28, in addition to being connected to the booster 24 and power steering gear 30, is also connected to the inlet 16 of the modulator 10.

A primary passage generally indicated by the numeral 32 is defined within the modulator housing 12 and communicates the inlet port 14 with the outlet port 18. An adaptive braking valve generally indicated by the numeral 34 is located within the primary passage 32 and is adapted to control fluid communication therethrough. The adaptive braking control valve 34 includes a valve seat 36, which is located on the wall of the passage 32 and a sphere 38 which is urged into sealing engagement with the seat 36 by a spring 40. Of course, when the sphere 38 is sealingly engaged with the seat 36, communication through the primary passage 32 is prevented. The smaller diameter portion of the bore 42 supports a piston 44 which has a face 46 and the larger diameter portion of the bore 42 supports a piston 45 which has a face 48 having a larger diameter than face 46. The face 46 of the piston 44 defines a part of the primary passage 32, and therefore, the piston 44 is responsive to the fluid pressure in the passage 32. The face 48 of the piston 45 cooperates with the wall of the housing 12 to define a control chamber 50 therebetween, the purpose of which will be described hereinafter. A plunger 52 is slidably supported in passage 32 and engages the face 46 of the piston 44. When the piston 44 is in the position illustrated in the drawing, the plunger 52 is of sufficient length to maintain the sphere 38 off the valve seat 36, to thereby permit fluid communication through the primary passage 32. The portions 54 and 55 of the pistons 44 and 45 which extend between the faces 46 and 48 are of a reduced diameter so as to be separated from the wall of the bore 42. A flexible diaphragm 56 interconnects the portion 55 of the piston 45 with the wall of the housing 12. This is necessary to insure separation between the fluid reacting on the face 46 from the fluid reacting on the face 48, should any of the fluid leak past their corresponding seals 58, 60, since the brake fluid acting on the face 46 is incompatible with the power steering fluid in the control chamber 50.

Modulator 10 further includes a bypass passage generally indicated by the numeral 62, which communicates the inlet 14 with the outlet 18 in bypass relationship with the adaptive braking control valve 34. Communication through the bypass passage 62, and through the primary passage 32, is controlled by a bypass control valve generally indicated by the numeral 64. Bypass control valve 64 includes a first valve seat 66, which is located on a portion of the primary passage 32 and circumscribes the latter, a second valve seat 68 which is similarly located within the bypass passage 62, and a sphere 70 which is carried between the valve seats 66 and 68 and is adapted to sealingly engage either of them. A plunger 72 which is operated by a spring 74 yieldably urges the sphere 70 into sealing engagement with the valve seat 66, to thereby prevent communication to the primary passage 32 and to open the bypass passage 62.

A failsafe piston 76 is slidably mounted in another bore 78 defined within the housing 12 and includes a plunger 80 which projects into the primary passage 32 adjacent the valve seat 66. The opposite end 82 of the piston 76 cooperates with the wall of the housing 12 to define a failsafe chamber 84 therebetween. Appropriate seals 86, 88 prevent fluid from leaking around the piston 76 from the failsafe chamber 84 and from the primary passage 32. A flexible diaphragm 90 interconnects the piston 76 with the wall of the housing 12. The diaphragm 90 is similar to the diaphragm 56 and performs an identical function.

The failsafe chamber 84 is communicated to the second inlet 16 by a first passage generally indicated by the numeral 92. The first passage 92 is communicated into the control chamber 50 by a second passage generally indicated by the numeral 94. A check valve generally indicated by the numeral 96 permits fluid communication from the passage 92 into the passage 94, but prevents fluid communication in the reverse direction. A third passage generally indicated by the numeral 98 communicates the second passage 94 to the outlet 20, and therefore to the low pressure side of the pump 28. Communication between the second passage 94, the third passage 98, and the control chamber 50, is controlled by a three-way, solenoid-actuated hydraulic valve generally indicated by the numeral 100. The valve 100 includes a first valve seat 102 which circumscribes the second passage 94, a second valve seat 104 opposite the valve seat 102 and which circumscribes the third passage 98, and a sphere 106 which is located between the valve seats 102 and 104 and which is adapted to sealingly engage either of them. A plunger 108 and spring 110 yieldably urge the sphere 106 into sealing engagement with the valve seat 104, to thereby prevent communication from the chamber 50 and second passage 94 into the third return passage 98. The solenoid generally indicated by the numeral 112 includes a plunger 114, which, upon energization of the solenoid, urges the sphere 106 away from the valve seat 104 and into sealing engagement with the valve seat 102, to thereby prevent communication from the second passage 94 into the control chamber 50, and to open communication from the control chamber 50 into the third or return passage 98. The solenoid 112 is controlled by output signals from an adaptive braking logic controller, of any suitable type well known to those skilled in the art. Since any appropriate controller may be used, details of a controller will not be disclosed herewithin. Upon deenergization of the solenoid 112, the spring 110 yieldably urges the sphere 106 back into sealing engagement with the valve seat 104.

MODE OF OPERATION

The various components of the modulator 10 are illustrated in the positions which they assume when the brakes of the vehicle are released. When a brake application is effected by operation of the brake pedal 26, the valve within the booster 24 develops back pressure in the hydraulic system in a manner well known to those skilled in the art to operate the master cylinder 22. The back pressure developed within the hydraulic system is communicated to the inlet port 16, and therefore into the failsafe chamber 84 and into the first passage 92. Fluid pressure in the chamber 84 urges the failsafe piston 76 to the left, viewing the drawing, and therefore urges the sphere 70 out of sealing engagement with the valve seat 66 into sealing engagement with the valve seat 68. Therefore, communication through the primary passage 32 is opened and communication through the bypass passage 62 is closed. Braking pressure generated by the master cylinder 22 is communicated through the inlet 14, around the open adaptive braking valve 34 and into the primary passage 32. Pressure is communicated through the primary passage 32 and the outlet port 18 to the brakes 116 to thereby effect a brake application. When the aforementioned electronic control unit senses an incipient skidding condition, the solenoid 112 is energized, to thereby drive the sphere 106 into sealing engagement with the valve seat 102 and opening the valve seat 104, to thereby release the fluid pressure stored in the control chamber 50 to the low pressure side of the pump 28 through the third passage 98 and the outlet 20. Since the fluid pressure level in the control chamber 50 which reacts on the face 48 of the piston 44 is abruptly reduced, the relatively high braking pressure in the primary passage 32 which acts on the face 46 urges pistons 44 and 45 to the right viewing the FIGURE. When the pistons 44 and 45 move a sufficient distance, the adaptive braking valve 34 closes, thereby terminating fluid communication from the master cylinder 22 to the outlet 18. As the pistons 44 and 45 move an additional distance due to the pressure imbalance across the pistons, the volume of the primary passage 32 is increased, thereby decreasing the fluid pressure level therein. The braking force is thereby appropriately reduced. When the aforementioned electronic control unit senses that the incipient skidding condition no longer exists, the solenoid 112 is deenergized, thereby permitting the spring 110 to urge the sphere 106 back in sealing engagement with the valve seat 104, to block fluid communication between the control chamber 50 and the outlet 20. At the same time, of course, fluid communication is permitted from the second passage 94 into the control chamber 50, and therefore the high pressure fluid developed by the power steering pump 28 is communicated into the chamber 50. Since the face 48 of piston 45 is substantially larger than the face 46 of piston 44, the high pressure fluid in the chamber 50 is sufficient to overcome the braking pressure in the passage 32 acting on the face 46, and therefore the pistons 44 and 45 are driven to the left, viewing the FIGURE. As this occurs, the volume of the primary passage 32 is again reduced, thereby again building braking pressure at the outlet 18 as the pistons 44 and 45 are moved to the left. Finally, when the pistons 44 and 45 have moved a sufficient distance to the left, the plunger 52 again forces the adaptive braking valve 34 to open, to again permit uninhibited fluid communication through the primary passage 32 between the inlet 14 and the outlet 18.

If the power steering pump 28 should fail during a brake application, due to either the stalling of the vehicle's engine or to some other cause, communication of braking pressure through the modulator 10 is assured. If the power steering pump should fail, the pressure level communicated to the inlet port 16 will drop to a relatively low level. However, the high pressure fluid stored in the control chamber 50 will remain, since the check valve 96 prevents fluid from escaping into the passage 92 from the passage 94, and the valve 100 prevents fluid communication from escaping from the control chamber 50 into the passage 98. Therefore, assuming no change in ambient temperature and assuming effective seals of the valves 98 and 100, the piston 44 will remain in the position illustrated in the drawing and the adaptive braking valve 34 will remain open. However, to be absolutely certain that fluid communication between the inlet 14 and the outlet 18 is not interrupted, the failsafe piston 76 has been provided. Upon failure of the power steering pump 28 the fluid pressure level in the failsafe chamber 84 will be abruptly reduced. The spring 74 and plunger 72 will thereupon urge the sphere 70 into sealing engagement with the seat 66, thereby blocking communication through the primary passage 32. At the same time, of course, the sphere 70 will be urged away from the valve seat 68, thereby opening fluid communication through the bypass passage 62. Since the bypass passage 62 bypasses the adaptive braking valve of 34, substantially uninhibited fluid communication will be permitted between the inlet of 14 and the outlet 18 through the bypass passage 62. When the power steering pump 28 is again operative, the failsafe chamber 84 will be repressurized, thereby reopening the primary passage 32 and closing the bypass passage 62. At that time, high pressure fluid at the inlet 16 will be communicated past the check valve 96 into the control chamber 50 to insure that the pistons 44 and 45 are urged to the left viewing the FIGURE, to assure opening of the adaptive braking valve 34, if the pressure level in the control chamber 50 has for some reason been reduced during the period of time that the power steering pump is inoperative.

We claim:

1. In a vehicle having a fluid pressure source, brake pressure generating means, and a fluid pressure actuated brake responsive to said brake pressure generating means, an adaptive braking modulator comprising:

a housing having an inlet communicated to said brake pressure generating means, an outlet communicated with said brake, and a primary passage communicating said outlet with said inlet;

adaptive braking valve means controlling fluid communication through said primary passage between said inlet and outlet;

fluid motor means responsive to the fluid pressure from said fluid pressure source for controlling said adaptive braking valve means, said fluid motor means being adapted to close said adaptive braking valve means and thereafter causing a fluid pressure reduction at said outlet;

electrically actuated valve means for controlling fluid communication to said fluid motor means to cause the latter to close the adaptive braking valve means and effect said pressure reduction at said outlet;

bypass passage means connecting said inlet to said outlet and bypassing said adaptive braking valve means, said bypass passage means including bypass valve means normally closing said bypass passage means and means controlling said bypass valve means, said last-mentioned means being responsive to the fluid pressure level developed by said fluid pressure source to open said bypass valve means when the fluid pressure level generated by said source fails, said fluid motor means including piston means having a pair of opposed faces and including means for operating said adaptive braking valve means in response to movement of the piston means, one of said faces being exposed to the fluid pressure in said primary passage, the other face cooperating with the wall of said housing to define a first variable volume control chamber therebetween normally communicated to the fluid pressure generated by said source, said housing having a second inlet communicated to said fluid pressure source, and a second outlet communicated to a fluid reservoir; and means communicating said first control chamber with said second inlet, and with said second outlet;

said electrically actuated valve means normally blocking communication between said control chamber and said second outlet and permitting communication between said second inlet and the first control chamber, said electrically actuated valve means upon energization thereof actuating to a position venting said first control chamber to the second outlet and blocking communication between the second inlet and the first control chamber.

2. The invention of claim 1:
said bypass valve means closing said primary passage when said bypass passage means is opened.

3. The invention of claim 2:
said bypass valve means including a first valve seat in said primary passage and a second valve seat in said bypass passage means, a valve member movable from a first position sealingly engaging said first valve seat to a second position sealingly engaging said second valve seat, and resilient means yieldably urging said valve member toward said first position, said means controlling said bypass valve means being responsive to the fluid pressure developed by said source to oppose said resilient means to drive said valve member toward said second position.

4. The invention of claim 3:
said means controlling said bypass valve means including fluid pressure responsive piston means operatively controlling the position of said valve member, one end of said piston means being communicated with the fluid pressure generated by said source.

5. The invention of claim 1:
said means controlling said bypass valve means including fluid pressure responsive means operably controlling the condition of said bypass valve means, said fluid pressure responsive means cooperating with the walls of the housing to define a second variable volume control chamber therebetween, the fluid pressure in said second control chamber controlling the position of the fluid pressure responsive means.

6. The invention claim 5: and
first passage means communicating said second inlet with said second control chamber, second passage means communicating said second inlet with the first control chamber, and check valve means permitting communication from the second inlet to the second passage but preventing communication in the reverse direction.

7. In a vehicle having a fluid pressure source, brake pressure generating means, and a fluid pressure actuated brake responsive to said brake pressure generating means, an adaptive braking modulator comprising:
a housing having an inlet communicated to said brake pressure generating means, an outlet communicating with said fluid pressure operated brakes, and a primary passage communicating the outlet with the inlet;
adaptive braking valve means controlling fluid communication through said primary passage between said inlet and outlet;
fluid motor means responsive to the fluid pressure from said source for controlling said adaptive braking valve means, said fluid motor means being actuable to close said adaptive braking valve means and thereafter causing a fluid pressure reduction at said outlet;
said fluid motor means including piston means having a pair of opposed faces and including means for operating said adaptive braking valve means in response to movement of the piston means, one of said faces being exposed to the fluid pressure in said primary passage, the other face cooperating with the wall of said housing to define a first variable volume control chamber therebetween normally communicated to the fluid pressure generated by said source;
electrically operated valve means actuable from controlling communication into said control chamber from said fluid pressure source to cause said piston means to close said adaptive braking valve means and thereafter to effect a brake pressure reduction at said outlet;
means for trapping fluid pressure for maintaining actuation of the piston means during a failure in said fluid pressure source,
said housing having a second inlet communicated to said fluid pressure source, and a second outlet communicated to a fluid reservoir; and
means communicating said first control chamber with said second inlet, and with said second outlet;
said electrically actuated valve means normally blocking communication between said control chamber and said second outlet and permitting communication between said second inlet and the first control chamber, said electrically actuated valve means upon energization thereof moving to a position venting said first control chamber to the second outlet and blocking communication between the second inlet and the first control chamber.

* * * * *